W. KLINE.
PNEUMATIC TIRE.
APPLICATION FILED FEB. 21, 1917.
1,252,703.
Patented Jan. 8, 1918.
2 SHEETS—SHEET 1.
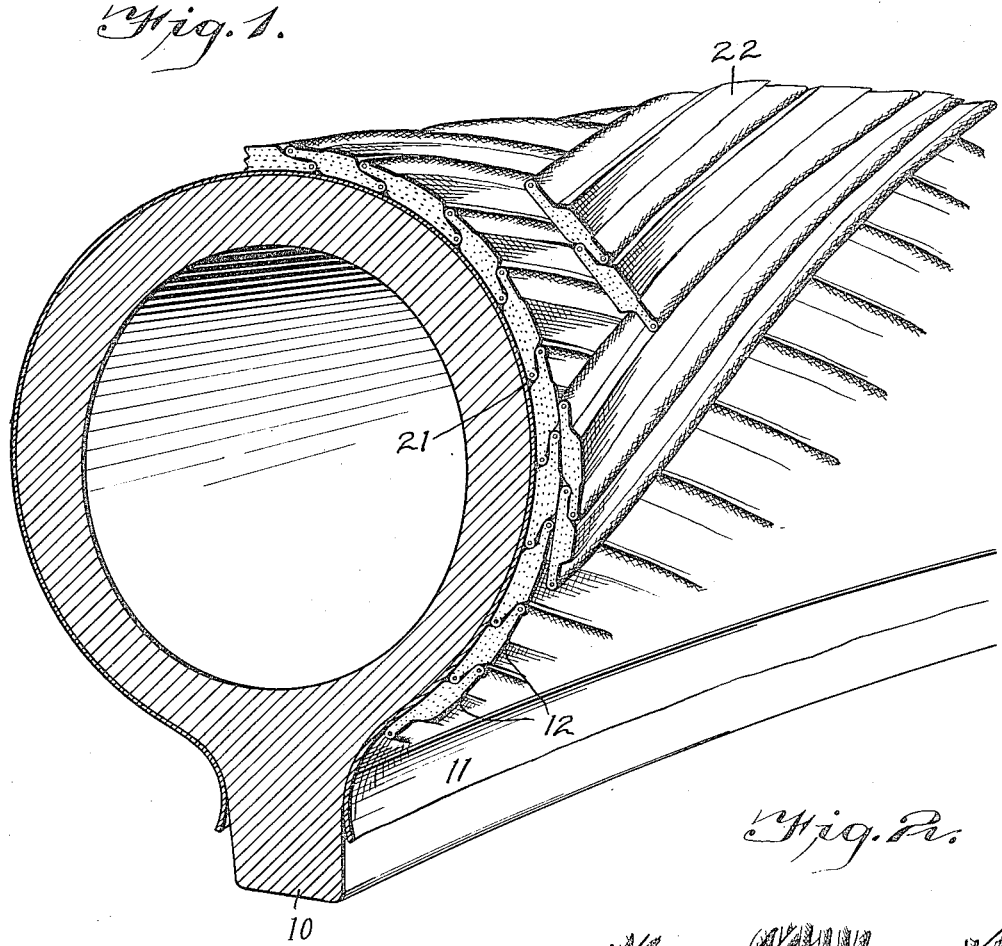
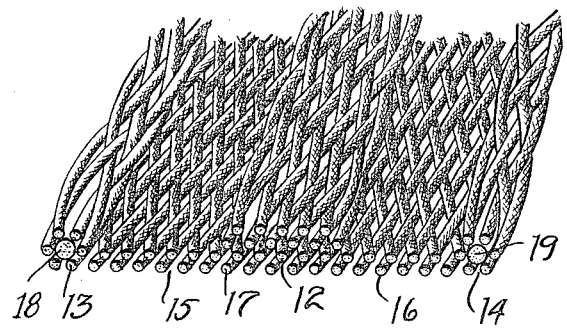
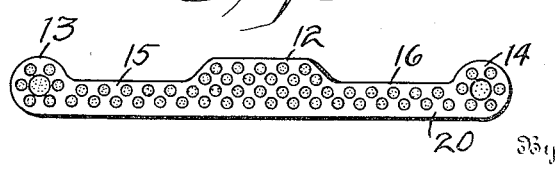
Inventor,
Walter Kline,
Knight Bros
Attorneys.

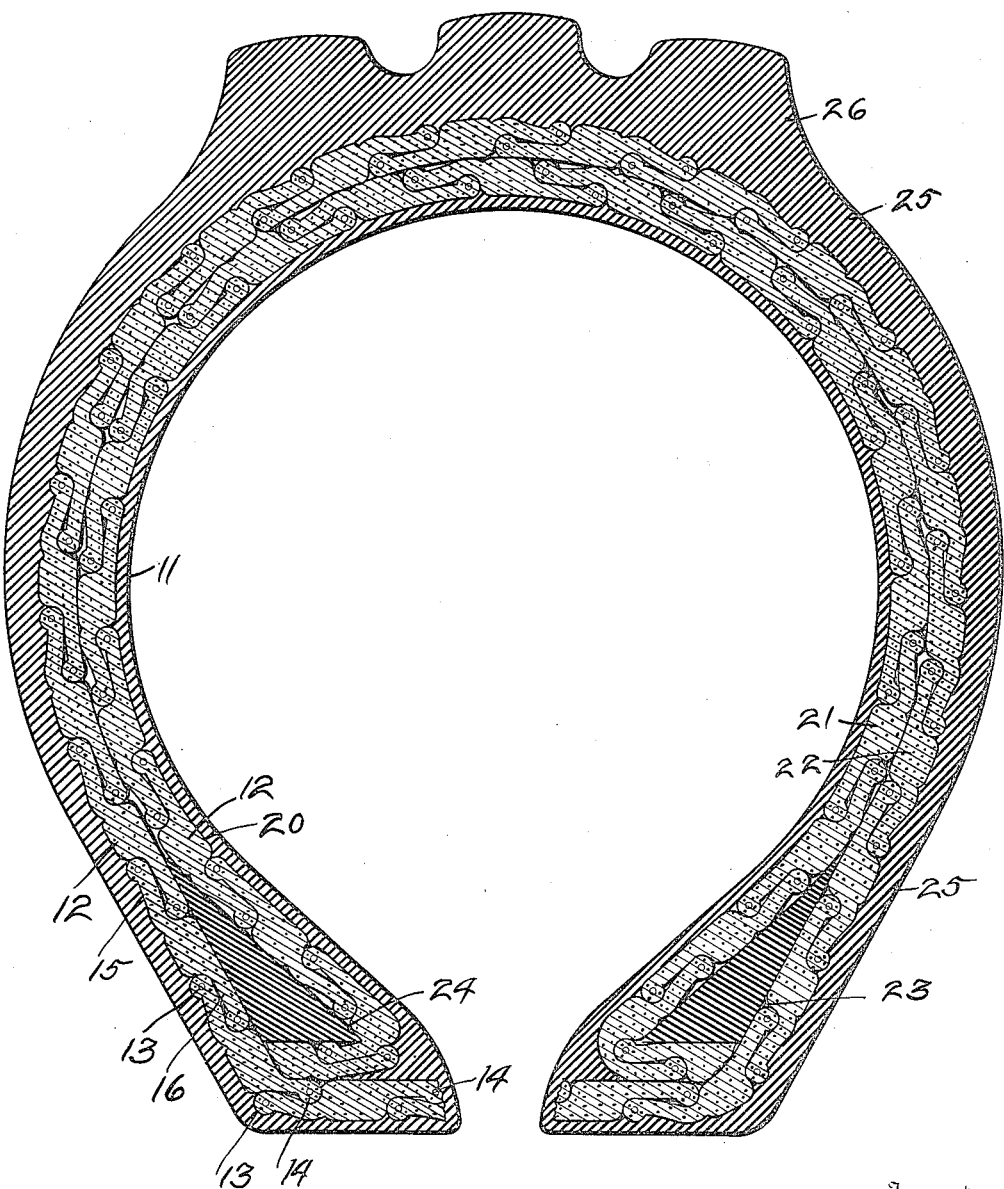

UNITED STATES PATENT OFFICE.

WALTER KLINE, OF LAKE, OHIO, ASSIGNOR OF ONE-THIRD TO FRANK L. KRYDER AND ONE-THIRD TO JOSEPH P. FRISBY, BOTH OF AKRON, OHIO.

PNEUMATIC TIRE.

1,252,703.   Specification of Letters Patent.   Patented Jan. 8, 1918.

Application filed February 21, 1917. Serial No. 150,100.

*To all whom it may concern:*

Be it known that I, WALTER KLINE, a citizen of the United States, residing at Lake, in the county of Stark and State of Ohio, have invented certain new and useful Improvements in Pneumatic Tires, of which the following is a specification.

This invention relates to pneumatic tires, and particularly to a core between the inner and outer sheathing of the casing.

One of the objects of the invention is to provide a tire casing which will possess a high degree of resiliency with a maximum wearing quality. I have found that a "corded" casing will afford a maximum degree of resiliency, but that the ordinary cord fabrics are easily bruised and the cords liable to part, unless reinforced at vulnerable points. It has heretofore been proposed to cord the tire for resiliency and then protect it by a fabric sheathing or insert of considerable thickness. The introduction of the thickened fabric has a tendency to materially lessen the resilient qualities of the tire so that the theoretical advantage of cording the tire is largely counteracted by the endeavor to protect it against puncture.

It is one of the purposes of my invention to provide a tire casing which will offer a maximum resistance to puncture, bruise or separation of cords and still maintain a high degree of resiliency, as well as prolonged service, due to the introduction of cords.

In actual practice, I prefer to employ the so-called "cords" in the form of tapes or ribbons, consisting of interwoven strands embedded in rubber or similar material with an intermediate thickened portion and beaded ends connected by comparatively thin webs. I prefer to apply the "cords" to the inner sheathing of the casing by cementing them together in diagonally overlapping layers and to have the edges of the "cords" overlap one with the other.

I shall hereinafter refer to the tapes or ribbons as "cords," because the tire shown by me belongs to the class of what is known as "corded tires," but it is to be understood that the word "cord" is not used in its usual sense, but is to be construed as broad enough to include fabrics, tape, ribbons or the like.

In the drawings:—

Figure 1 is a fragmentary view of a mandrel or core showing the inner sheathing of the tire with the cords partially applied thereto, the outer sheathing being removed;

Fig. 2 is an enlarged detail view of one of the tapes or cords preparatory to being embedded in the rubber;

Fig. 3 is an end view of the finished tape or cord, and

Fig. 4 is a sectional view of a finished tire casing.

In carrying out the invention, I prefer to employ the usual mandrel or core 10 on which is preliminarily formed the inner sheathing 11 of the casing. After the inner sheathing is provided, the cords are applied in diagonal relation, as shown in Figs. 1 and 4. The construction of the cords or tapes is best shown in Figs. 2 and 3 as consisting of a fabric having an intermediate thickened portion 12 and end thickened portions 13 and 14, the end portions 13 and 14 being connected to the intermediate portions by the webs 15 and 16. The cords preferably consist of interwoven strands 17 and core end cords 18 and 19. After the fabric is formed, as shown in Fig. 2, it may be embedded in a plastic material 20, such as rubber or the like, either by emersion, or by being subjected to pressure. When the strips or cords are formed as shown in Fig. 3, they are adapted to be applied in diagonal relation over the inner sheathing 11, as shown in Fig. 1. By reference to Fig. 1, it will be observed that the relatively thin web of one strip or cord overlaps the relatively thin web of the adjacent strip or cord, so that the first layer is of uniform thickness, inasmuch as the webs are substantially one-half the thickness of the thickened portions 12. In applying the cords or strips, they are cemented together, and to the sheathing 11, and after the first layer is applied, a second diagonal layer may be placed over the first in opposite diagonal relation and cemented in substantially the same way as the first layer. In applying the layers 21 and 22, they are preferably anchored by the beads or anchors 23 and 24 in the usual manner, and then an outer sheathing 25 is applied preferably with a corrugated or other type of tread 26 after which the casing is placed in the mold in the usual manner and finished.

I claim:—

1. A tire casing provided with a core consisting of diagonally arranged strands or cords, each of which has a relatively thick middle portion and relatively thin overlapping portions extending from the edges of the middle portion, the edge of one strand overlapping the edge of the adjacent strand.

2. A tire casing having a core consisting of overlapping diagonally arranged strands, each strand comprising an interwoven fabric with a relatively thick middle portion and a cementitious embedding material for said fabric.

3. A tire casing having a core consisting of strands or cords each of which has a relatively thick middle portion, and relatively thin portions extending from the edges of the relatively thick portion, the edge of one strand overlapping the edge of an adjacent strand.

4. A tire casing having a core of diagonally arranged cords comprising strips with relatively thick central portions and relatively thick edges, the portions of the strip between the central portions and the edges being substantially one-half the thickness of the central portion, and a cementitious embedding material for said strip.

5. A tire casing having a core of diagonally arranged cords comprising strips with relatively thick central portions and relatively thick edges, the portions of the strips between the central portions and the edges being substantially one-half the thickness of the central portion.

The foregoing specification signed at Akron, Ohio, this 19th day of February, 1917.

WALTER KLINE.